United States Patent
Hurding et al.

(10) Patent No.: US 12,454,618 B2
(45) Date of Patent: Oct. 28, 2025

(54) APPARATUS AND METHOD FOR THE PREPARATION, PROCESSING OF FIBRE MIXTURES AND FORMING PRODUCTS THEREFROM

(71) Applicant: Zelfo Technology GmbH, Brandenburg (DE)

(72) Inventors: Richard Hurding, Brandenburg (DE); Grégoire Leveque de Vilmorin, Munich (DE)

(73) Assignee: Zelfo Technology GmbH, Brandenburg (DE)

( * ) Notice: Subject to any disclaimer, the term of this patent is extended or adjusted under 35 U.S.C. 154(b) by 238 days.

(21) Appl. No.: 17/791,592

(22) PCT Filed: Jan. 11, 2021

(86) PCT No.: PCT/EP2021/050396
§ 371 (c)(1),
(2) Date: Jul. 8, 2022

(87) PCT Pub. No.: WO2021/140249
PCT Pub. Date: Jul. 15, 2021

(65) Prior Publication Data
US 2023/0043885 A1     Feb. 9, 2023

(30) Foreign Application Priority Data
Jan. 9, 2020   (GB) ........................... 2000263

(51) Int. Cl.
*C08L 97/02*    (2006.01)
*D21C 5/02*    (2006.01)
*D21H 11/12*    (2006.01)

(52) U.S. Cl.
CPC ............... *C08L 97/02* (2013.01); *D21C 5/02* (2013.01); *D21H 11/12* (2013.01)

(58) Field of Classification Search
CPC ............. D21C 5/02; D21H 11/12; D21B 1/22
See application file for complete search history.

(56) References Cited

U.S. PATENT DOCUMENTS

| 4,088,528 A | * | 5/1978 | Berger | ...................... B30B 9/16 |
| | | | | 162/28 |
| 4,214,947 A | * | 7/1980 | Berger | ...................... B30B 9/12 |
| | | | | 162/DIG. 2 |

(Continued)

FOREIGN PATENT DOCUMENTS

| AU | 712027 B2 | * | 10/1955 |
| CN | 108824048 A | * | 11/2018 |

(Continued)

OTHER PUBLICATIONS

Smook, Handbook for Pulp and Paper Technologists, 1992, Angus Wilde Publications, 2nd edition, chapters 5, 8, 9, 13, 16, and 17. (Year: 1992).*

(Continued)

*Primary Examiner* — Anthony Calandra
(74) *Attorney, Agent, or Firm* — Head, Johnson, Kachigian & Wilkinson, PC

(57) ABSTRACT

The invention to which this application relates is apparatus and a method for use in the preconditioning, processing of a material mixture and forming of end products from the processed material mixture which includes fibres such as cellulose fibres so as to allow the end products including the same to be formed in an efficient and controllable process.

19 Claims, 3 Drawing Sheets

(56) References Cited

U.S. PATENT DOCUMENTS

| | | | | |
|---|---|---|---|---|
| 5,716,669 | A * | 2/1998 | LaRose | B29B 7/487 |
| | | | | 427/430.1 |
| 6,283,300 | B1 * | 9/2001 | Bielagus | B07B 4/02 |
| | | | | 209/139.1 |
| 2003/0021915 | A1 * | 1/2003 | Rohatgi | C08L 97/02 |
| | | | | 264/211.23 |
| 2008/0237914 | A1 * | 10/2008 | Lustiger | C08J 5/047 |
| | | | | 264/143 |
| 2011/0094691 | A1 * | 4/2011 | Nunn | D01G 11/00 |
| | | | | 162/2 |
| 2012/0205059 | A1 * | 8/2012 | Senturk-Ozer | D21C 1/10 |
| | | | | 162/10 |
| 2012/0295313 | A1 * | 11/2012 | Berglund | B29B 15/08 |
| | | | | 264/141 |
| 2016/0208126 | A1 * | 7/2016 | Rogers | A61K 9/5078 |

FOREIGN PATENT DOCUMENTS

| | | | |
|---|---|---|---|
| WO | WO0006650 | 2/2000 | |
| WO | WO-2005045126 A1 * | 2/2005 | ......... D21C 11/0092 |
| WO | WO2007056839 | 5/2007 | |
| WO | WO2010149711 | 12/2010 | |
| WO | WO2019112428 | 6/2019 | |

OTHER PUBLICATIONS

English Machine abstract of CN108824048A, 2018. (Year: 2018).*

* cited by examiner

APPARATUS AND METHOD FOR THE PREPARATION, PROCESSING OF FIBRE MIXTURES AND FORMING PRODUCTS THEREFROM

CROSS-REFERENCE TO RELATED APPLICATIONS

This application is a national phase application of International PCT Application No. PCT/EP2021/050396 dated Jan. 11, 2021 which claims priority to British Patent Application No. 2000263.0, filed Jan. 9, 2020, which is incorporated herein by reference.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A READ-ONLY OPTICAL DISC, AS A TEXT FILE OR AN XML FILE VIA THE PATENT ELECTRONIC SYSTEM

Not Applicable

STATEMENT REGARDING PRIOR DISCLOSURES BY THE INVENTOR OR A JOINT INVENTOR

Not Applicable

BACKGROUND OF THE INVENTION

1. Field of the Invention

The invention to which this application relates is apparatus and a method for use in the preconditioning, processing and post production of materials which include fibres, and particularly, although not necessarily exclusively, cellulose fibres so as to allow end products including the same to be formed.

2. Prior Art

Various methods and apparatus are known in the art of providing defibrillated cellulose fibres, as are end uses thereof. There is a known requirement to be able to use and form the material including the fibres into an end product when the material is in a wet or semi dry form.

BRIEF SUMMARY OF THE INVENTION

An aim of the current invention is particularly, although not necessarily exclusively, directed to apparatus and a method for providing and forming materials which include semi-dry cellulose fibres in an efficient manner.

In a first aspect of the invention, there is provided a method of forming and using a material including cellulose fibres, wherein said method includes the steps of pre-processing the cellulose fibres, forming a material mixture including said cellulose fibres, and one or more added agents and/or components to the material mixture, processing the said material mixture and forming the processed material mixture into an end product capable of being used for a predefined function.

In one embodiment, the pre-processing step includes the selection of appropriate source materials which, in one embodiment, comprise short, medium or long fibre ligno-cellulosic materials. In one embodiment, these materials include industrially produced cellulose from hard and soft wood sources, fibre crops such as grasses, bagasse, hemp, flax, miscanthus, bamboo, reeds.

In addition, or alternatively, agricultural and horticultural sources can be used. In one embodiment, these include straw such as, rice straw, wheat straw, barley straw, rye straw, oat straw, hemp shives (hurds), cotton bush, reeds, grasses, woodchip, sugarcane leaves, water hyacinths, and/or plant stems.

In another embodiment, the source materials include recycled and/or residue and/or waste fibres from industrial, consumer and/or domestic sources. In one embodiment, these include all grades of waste and residual paper, cardboard, packaging, pulp, paper based utensils, vessels and the like.

In another embodiment, the source material can be waste and/or residuals from the food and beverage industries, including, but not limited to, pomace, coir, sugar beet residue and sugar cane bagasse.

In one embodiment, the source material may be taken from waste and residuals from textile industries including ginning waste, cotton noils and wool waste.

In one embodiment, the source material may include industrially processed ligno-cellulosic waste/residuals from industries such as furniture manufacture, sawmills, forestry, paper manufacture, packaging, printing and the like.

In an alternative embodiment, the source material may include new recycled waste or residual material streams for use as fillers and/or property enhancing additives.

In one embodiment, the preparation step includes a step of size reduction of the source materials which may be achieved by cutting and/or shredding and/or dispersement and/or division of the source materials.

In one embodiment, these steps are performed by use of water or air jet apparatus to apply the water or air jet to the fibres in order to achieve the desired, processable size of the cellulosic material.

In one embodiment the preparation includes the use of any or any combination of granulator, hammer mill, shredder, water and/or air jet apparatus. In addition, or alternatively, other reduction machinery and systems can be used with the selection of the apparatus, or combination of apparatus which is used typically being dependent upon the end fibre length which is required to go forward to the processing step.

In one embodiment, when the source material includes relatively long fibres, a treatment can be performed to "comb out" the fibres into individual fibres. The treatment may be performed using pin rollers, textured rollers, carding systems or combinations of the same and can be useful to even out all potential feedstocks by teasing out fibre clumps and thereby enabling more even subsequent processing.

Alternatively, if a fibre mix is desired, the unprocessed source materials can be mixed in proportions according to the specific requirements and using suitable mixing equipment. In certain cases, the different fibre sources can be prepared and processed independently and then blended together in a suitable mixer prior to the subsequent steps being performed.

In one embodiment, a fibre softener or preservative is added and, in one embodiment, calcium oxide and/or sodium hydroxide may be an additive. The additives can also be used to activate any lignin present which will strengthen the bonding within the end products which are formed.

The preservative addition can also aid in the preservation of the final process material and thereby allow the same to be stored at room temperature for a significant period of time, such as six months, without any significant degradation before the same is then used to form the desired end products.

In one embodiment, the amount of the additive added by weight will range from 0.01 to 6% to a dry fibre and for fibre sources with very high lignin content such as coir (coconut fibre) the amount added could be 7.5% up to 15% by weight of the dry fibre.

In one embodiment, the additive will form insoluble compounds with the lignin which will not be washed out during pressing or moulding.

In one embodiment, a liquid such as water is added to the mix to set it to a solid content of between 10% to 90%, depending upon the raw materials being used, for example, tomato stems will have a solids content of at around 10% while pure cellulose will have a solids content of around 90%.

In one embodiment, the prepared material is passed through a pre-processing stage by passing the same into a pressurised or standard atmospheric pressure steaming chamber.

In one embodiment, the steaming chamber is fitted with either a single or double screw or other material transport method with or without the prior addition of softening agents.

Typically the pre-processing steps and/or chemical additive acts to soften the fibres prior to actions being performed, such as manipulation to restructure the fibres and/or defibrillation.

In one embodiment, one or a range of synthetic or natural products can be added to the cellulose fibre material during the processing stage.

In one embodiment the synthetic or natural products may include any, or any combination, of dyes or pigments, retention aids, such as alum polyacrylemides, sizing agents, such as rosin, ketene dimers, strengthening agents, such as starches, and/or lubricants for moulding and extrusion.

In one embodiment, the processing steps include the prepared material being transferred via suitable dosing and/or stuffing apparatus to processing apparatus. In one embodiment, the processing unit includes a single, twin or multiple screw extruder.

Typically therefore, the material, during the processing step, is processed into a pre-determined mixture of millimetre, macro, micro and/or nano dimensioned fibres, preferably, although not necessarily exclusively, using apparatus as defined in the applicant's co-pending patent applications or apparatus as herein defined in this current application which provides improved apparatus.

Typically the biomass material is manipulated using purpose designed fibre manipulation components which can commence with the reduction of larger fibre lengths such as 1-50 mm fibre length reduction and this can be achieved by passing the material through processing elements formed so as to have processing faces which perform a tearing action.

The material is then passed through components in order to achieve the optimum opened fibre structure and this typically allows the fibres to be sequentially reduced and defibrillated using multi planar fibre refining/contact surfaces.

Typically, components with fibre type specific profiles are employed in order to achieve the desired sequencing of the fibre reduction and manipulation. In one embodiment this can comprise (separately and/or in combination):
1. Relatively aggressive fibre defibrillation zones with precise/extreme machine component contact. Step for step biomass size related.
2. Fibre to fibre defibrillation zones.
3. High and low pressure fibre structure state changing zones.
4. Material holding zones.
5. Technology hardware component alignment zones to allow the machine life to be extended.

In one embodiment, unprocessed source material can be added and mixed with processed fibres if required.

In one embodiment, during the processing stages, further materials can be added via feeding apparatus situated at pre-determined intervals along the length of the screws. In one embodiment, the materials which are added include any, or any combination, of processed or un-processed fibres, minerals, dyes or pigments, retention aids such as alum and polyacrylamides, sizing agents such as rosin and ketene dimers, strengthening agents such as starches, and/or lubricants to aid in the moulding and extrusion procedures.

In one embodiment one or more components may be extracted from the material mixture during and/or at the end of the processing step and typically prior to the moulding or forming stage. In one embodiment the components which are extracted can be any, or any combination of lignin, hemicellulose, nutrients and/or sourced materials and which material may be extracted to improve the consistency of the material mixture prior to moulding and/or forming and/or to allow the components to be used for separate, further processes and end uses.

In one embodiment, the processed fibre, or fibre and additional materials mix, exits from the processing step at a required solid (dry material) content relative to moisture (water or other fluid medium as required) as per the end product and product finishing criteria demands.

In one embodiment, the range is any of 2% to 10%, 10%-30%, 30% to 50%, 50% to 65%, or 65% to 99% and the particular choice of a range of solid content is in one embodiment determined with reference to the perceived usefulness of either inbound (captured water) or surface water to the forming process step.

Typically, the processed material is then further adapted.

In one embodiment, the further adaptation can include a number of steps such as fibre opening, initial drying and/or fibre mat forming, to produce the end product.

If fibre opening and initial drying are performed then, in order to ensure an absence of clumps in the process material and to precipitate fibre networking, the following steps can be performed, alone or in combination; passing the fibre material mix between rotating textured elements, carding apparatus and/or pin rollers, of various grades of fineness, and/or passing the fibre material mix through fibre preparation devices, such as those used in the textile industry, such as serrated rollers. In one embodiment air drying of the material can also be performed using blow and air or electro wave technology.

If fibre mat forming is performed the fibre or fibre and additional materials mix can be accelerated towards and introduced to a first forming station in which they are arranged in a non-woven mat type formation. The methods for achieving this include any or any combination of acceleration of the fibres or fibre material mix from the pin roller or combing devices towards the mat forming area. Further fibres or additives may be included during this step and/or the fibre material mix is airstream directed and/or cyclone mixed with additional fibres and additives if required and then directed to the non-woven type mat forming section.

These adaptation steps can encourage even fibre distribution in the final board or moulded product and thus improve overall strength properties and elimination of weak spots.

Preferably, the solid content of the mix is 30-45% or 45-65% or, in some cases, where an open structure is required to achieve high end insulation properties, the solid content may be higher such as up to 80%.

In one embodiment, in the forming step the material is passed onto a carrier means which may in one embodiment comprises a relatively flat carrier or base. The carrier or base can be formed of any or any combination of cellulose, paper, fabric, plastic, polymer and/or metal or into a mould in preparation for forming or moulding and can be adapted to prevent ingress of contaminant materials.

In one embodiment, the carrier may be provided in a static form or as a continuous band. In one embodiment the continuous band may be provided as a conveyor belt or may be formed as a moving sequence of 3 dimensional forms.

In on embodiment the carrier is provided in a mesh configuration.

The material is then passed to product forming stages and this can include any or any combination of the following:

For thin products, such as paper and packaging and cardboard, the products are formed using a hot pressing operation, either in a flat form to form boards, or in a mould as part of moulding apparatus to form 3D products.

The forming can be carried out at moulding stations or in a continuous process using endless carrier apparatus or appropriate substrates or on a moving sequence of forms by pressing. The carrier may be heated, tempered or cooled and may pass between successive pairs of pressing rollers at set required widths apart which depend on the characteristics of the product which is to be formed.

At certain points during the process, the product can come into direct contact with the rollers for reasons of processing efficiency or surface modification and at any point the rollers may be used to control temperature or cooling of product. Conditioning using convection air systems may also be employed.

In one embodiment, the pressing temperature will range from 25 to 400 and more typically 50° C. to 220° C. with pressures up to approximately 2000 bar applied and depending upon the final product density which is required.

In one embodiment, the product may be dried to a desired solid content of between 25-40%, 40-50%, 50-80%, or 80-99%.

In an alternative method, the fibre mat is lead into an electro wave drying and/or conditioning step, such as achieved by the imparting of electrostatic to the fibres, either in individual moulds or via a continuous band and based on similar transport systems as described above. The products are formed and dried simultaneously using various electro wave systems which may include any, or any combination, of microwave, radio frequency, short wave, infrared.

Drying may be implemented using convection and/or contact heated surfaces. The transport and forming systems are electro wave compatible so that the product undergoing forming and drying is held in place by a compression device and dried through the application of the aforementioned electro wave technologies and supported, where required, by conventional contact or convection heating systems.

In an alternative method, where geographical ambient conditions are such that the day time temperatures are 20° C. and above for much of the year, it is possible to achieve much of the drying operation under glass or in poly tunnels, and, if required, using special magnifying technologies and/or glazing systems.

In another embodiment, kiln drying may be used.

Once the product is formed, post forming operations can be performed if required and with respect to the final product use. For example, products which are formed can include food related products, packaging products, paper products, cardboard type products, low density panel products, mid density panel products, relatively high density panel products, 3D formed packaging products, 3D formed engineering products, 3D formed furniture, 3D medical container/bowl forms, 3D formed building products, and/or 3D formed household consumer goods In one embodiment the 3D forming of objects includes the use of Air Laid Technology incorporating the use of 3 dimensionally shaped transport 'wires', heated moulding forms and/or sheets and/or male and female rolls.

Examples of the products which can be formed include, but are not limited to, Packaging items, Crockery and cutlery; product presentation/point of sale items; trays; clamshell containers; beverage carriers; Furniture, transport and building products panels and/or single use medicine/food containers/dispensers Surface treatments may be performed such as to add a range of natural or synthetic materials to protect the surface of the product, to decorate the same and/or improve water resistance and these treatments may be added before or after the forming steps. In one embodiment the surface treatment is provided as a final step by, for example, chamber ventilation with or without additional heat and/or cooling and the de-humidification systems and/or radio frequency conditioning with or without an environment which is suitable.

In one possible use of the invention, the semi-dry fibres can be used to form 3 dimensional objects using a technology known as "airlaid" technology which allows 3 dimensionally shaped transport wires to be used in addition to or in combination with heated moulding forms, sheets or rolls. Products which can be made in this form can include packaging, crockery, cutlery, product presentation and point of sale materials, trays, clamshell containers, beverage carriers, furniture, transport and building product panels and/or single use medicine food containers and dispensers.

In a further aspect of the invention there is provided apparatus for forming and using a material mixture including cellulose fibres by performing pre-processing, processing and forming steps on the material mixture, said apparatus including mixing means to allow the selected source materials and further selected agents or components to be combined at the pre-processing step, moulding and/or pressing apparatus to perform the processing step and wherein the processing step includes extrusion apparatus including at least one screw extruder and along which said material mixture is passed.

In one embodiment the screw extruder includes fibre manipulation components with contact surfaces to contact the said material mixture as it passes along the one or more screw extruder longitudinal axis and said contact surfaces act to tear and defibrillate the fibres of the material mixture.

In one embodiment the screw extruder includes fibre manipulation components with contact surfaces to contact the said material mixture as it passes along the one or more screw extruder longitudinal axes and said contact surfaces act to reshape and/or change the structure of the fibres of the material mixture. In one embodiment the reshaping acts to rekink the fibres.

In one embodiment the contact surfaces are provided on elements located along the longitudinal axis of the one or more screw extruders and said elements are selectively positioned so as to form a first zone to cause fibre defibrillation, a second zone to cause fibre-to-fibre defibrillation, a third zone to cause high- and low-pressure state changing of the structure of the fibres and a fourth zone to perform a holding action on the material mixture.

In one embodiment further components are added to the material mixture during the processing step via feeder apparatus situated at predetermined intervals along the length of the screw extruder apparatus.

BRIEF DESCRIPTION OF THE DRAWINGS

Specific embodiments of the invention are now described with reference to the accompanying drawings wherein.

DETAILED DESCRIPTION OF THE INVENTION

Figure 1:
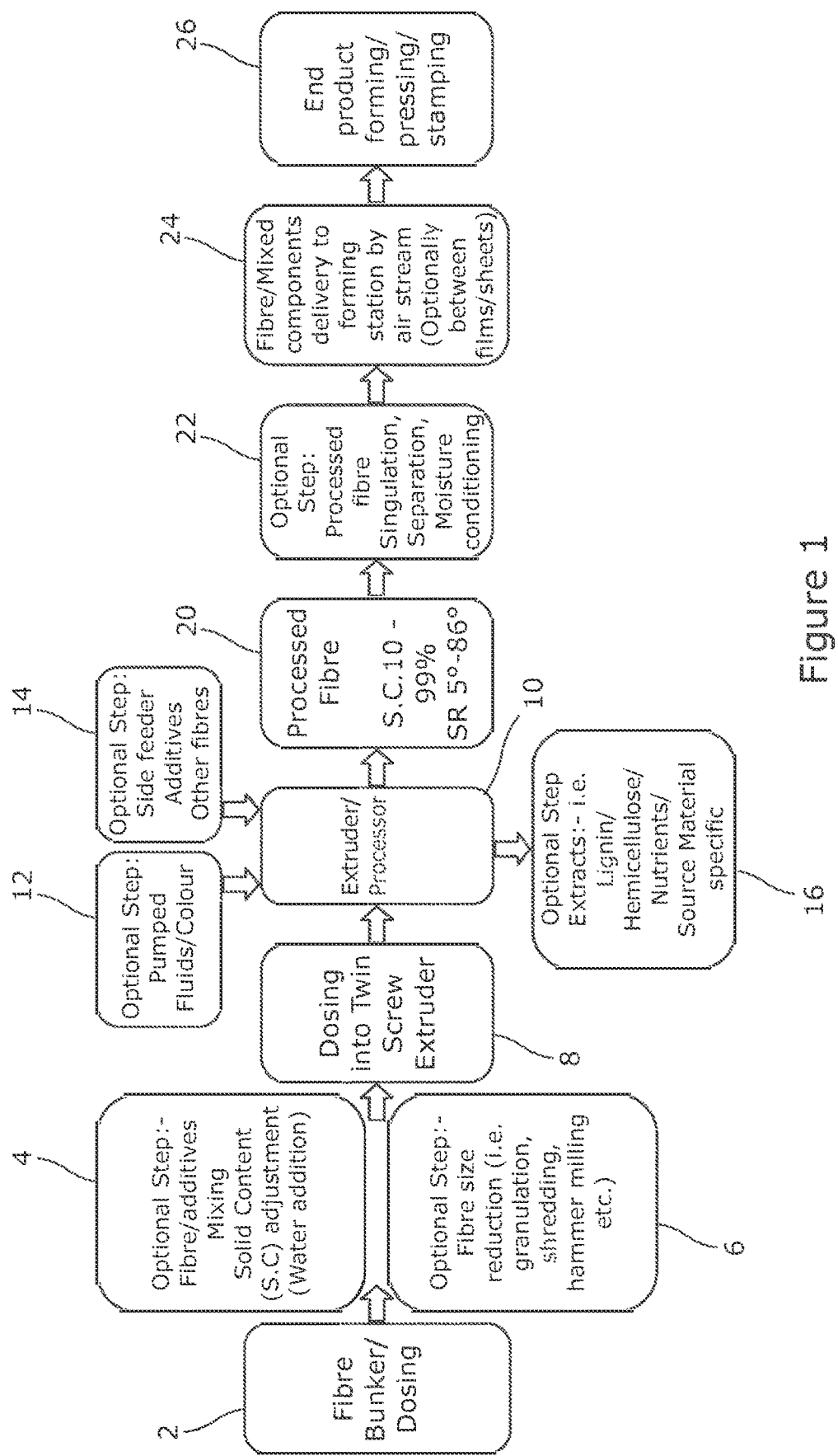
FIG. 1 illustrates a schematic diagram of the method and apparatus used in accordance with one embodiment of the invention.

In the method embodiment as described in FIG. 1, there is provided apparatus which includes a storage area 2 into which selected source material fibres which are to be utilised, are deposited and which may also include the ability to dose the said fibres with further agents and components which are selected as required for the particular process and/or end product type which it is to be formed. It should be appreciated that the particular further components and agents which are dosed, may change depending on the particular requirements for the particular process and end product. These are then combined to form the material mixture which is to be processed and subsequently formed.

There is provided the optional step 4 of mixing the fibres and any agents and component additives, with a quantity of water or other liquid to define the particular solid content (SC) of the mixture. In addition, or alternatively, the optional step 6 may be performed to reduce the size or dimensions of the fibres and this include the use of the processed of granulation, shredding, hammer milling or other processes which can be utilised to perform the required reduction.

Figure 2A:
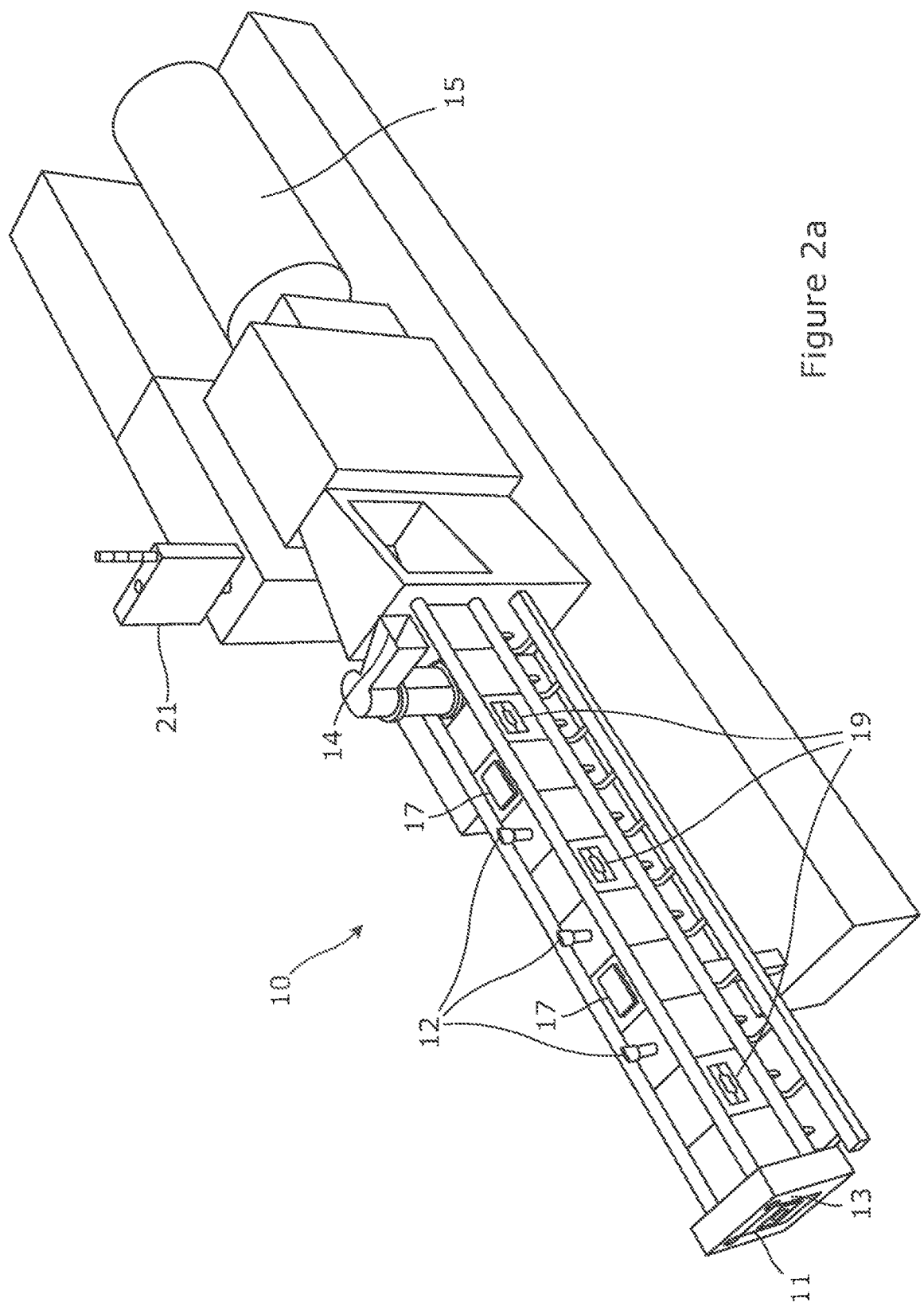
FIGS. 2a and b illustrate perspective and plan views of an embodiment of apparatus used in the processing step in accordance with the invention.
Figure 2B:
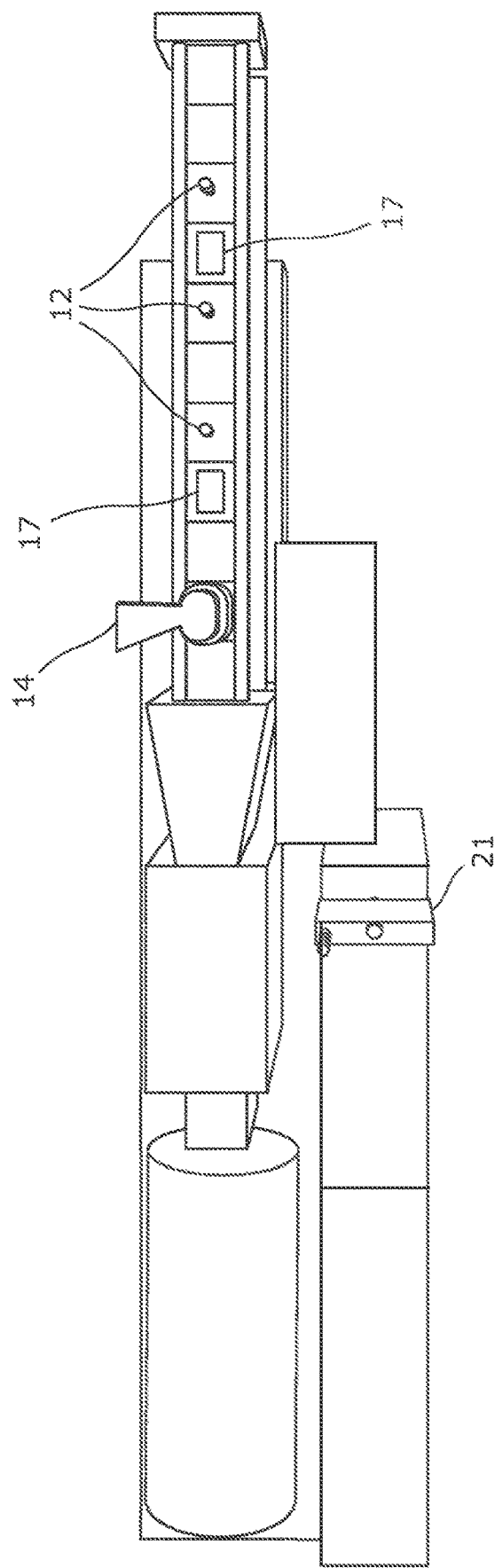

At stage 8, the material mixture in the required format, is dosed and transferred into screw extrusion apparatus 10, one type of which is illustrated in FIG. 2 and which in this embodiment includes at least two screw extruders 11,13 which are provided to rotate along respective shafts which are parallel, and driven by a motor 15 and the extruders have extrusion elements mounted along the respective said shaft to form a passage along which the material mixture passes as the spacing between the outer contact surfaces of said elements define the size of the passage 19 through which the mixture is moved along the extrusion apparatus and is processed. The particular form of the outer contact surfaces of the screw extruders are selected to suit the particular use of the fibre mixture and typically the contact surface pattern of the elements change along the length of the screws so as to form different zones in which differing functions are performed on the fibres of the material mixture as it passes along the extrusion apparatus. Also at the extruder apparatus 10, the apparatus includes liquid inputs 12 to allow the pumping of additional fluids and/or colour components, and an input 14 for the feeding of components such as the fibres and the material mixture 14 into the extruder. Additional access apertures 17 on the top and side apertures 19 are provided to allow access at spaced intervals to the housing in which the extruders are located. The step 16 of extracting material from the extrusion process such as lignin, hemicellulose, nutrients and/or sourced materials so as to remove these from the material mixture during the processing step is also performed and the access apertures 17,19 may be used for this purpose as and when required. The apparatus also includes control means and control panel 21 for user interaction to allow the control of the operation of the apparatus to be achieved in a required format. It will therefore be appreciated that each or a combination of these optional steps may be performed with respect to the final use of the material and/or the type of material which is being processed.

At stage 20, the processed fibres which, typically, although not always, will now be substantially binder free, and may have a solid content in the range of 10-98% and an SR ratio of between 5° and 86°. and the processed material mixture leaves the extrusion apparatus. An optional step 22 may then be performed to process the fibre by using any or any combination of singulation, separation and/or moisture conditioning and the fibres are then passed to stage 24 where the fibre and mixed components are delivered to a forming station 26, typically by an airstream or other movement system which allows the fibres which have been processed to reach the end forming/pressing/stamping/moulding apparatus. In one embodiment, the fibres may be moved to the forming station 26 by being passed onto a carrier which may take several forms and the appropriate form can be selected for the material mixture and subsequent forming procedures such as moulding, pressing or the like, which may be performed to form the desired end product.

In one embodiment the processed material mixture between films and/or sheets so as to define the passage along which the fibres are passed. The end product forming can then be achieved using appropriate forming techniques to define substantially planer and/or three-dimensional items.

SEQUENCE LISTING

Not Applicable

The invention claimed is:

1. A method of forming an end product from a source material including cellulose fibres, said method comprising the steps of:
pre-processing the cellulose fibres to form pre-processed fibres;
treating to separate the pre-processed cellulose fibres into individualized fibres;
forming a material mixture including said individualized fibres, and one or more added agents or components including any, or any combination of, a liquid, a softener agent, preservative agent, calcium oxide or sodium hydroxide;
processing the material mixture by passing the same along extrusion apparatus including at least two screw extruders which are provided to rotate along respective shafts which are parallel and forming a processed material mixture which leaves the extrusion apparatus into an end product capable of being used for a predefined function said at least two screw extruders include fibre manipulation elements with contact surfaces to contact the said material mixture as it passes along the extrusion apparatus longitudinal axis and said contact surfaces act to reshape, tear and/or defibrillate the fibres of the material mixture and providing the said contact surfaces on said elements located along the longitudinal axes of the said at least two screw extruders and changing the contact surface pattern along the length of the at least two screw extruders so as to form different zones in which differing functions are performed on the fibres of the material mixture as it passes along the extrusion apparatus and wherein the material mixture at the forming the end product step is passed to a carrier into a moulding section and then moulded or otherwise formed into the end product.

2. A method according to claim 1 wherein the pre-processing step includes selection of source material comprising fibre ligno-cellulosic materials.

3. A method according to claim 2 wherein agricultural and/or horticultural sources of fibres are used and included any or any combination of straw, rice straw, wheat straw, barley straw, rye straw, oat straw, hemp shives (hurds), cotton bush, reeds, grasses, woodchip, sugarcane leaves, water hyacinths, pomace, coir, sugar beet residue and/or sugarcane bagasse and/or plant stems, industrially produced cellulose from hard and/or softwood sources and/or crops such as grasses, bagasse, hemp, flax, miscanthus, bamboo and/or reeds recycled and/or residue and/or waste fibres including any or any combination of waste and residual paper, cardboard, packaging, pulp, paper-based utensils, vessels, ginning waste, cotton noils and/or wool waste.

4. A method according to claim 2 wherein the said one or more added agents or components is selected from recycled waste or residual materials for use as fillers or additives.

5. A method according to claim 2 wherein unprocessed source materials are added and mixed with the pre-processed cellulose fibres.

6. A method according to claim 2 wherein the material mixture is passed through a pressurised or standard atmospheric pressure steamed chamber.

7. A method according to claim 2 wherein agents are added to the material mixture in the range of 0.1-80% of the dry fibre in the material mixture at the processing stage.

8. A method according to claim 7 wherein the agent is added to activate lignin present in the material mixture and hence strengthen the bonding within the end products which are formed.

9. A method according to claim 1 wherein the pre-processing step is the size reduction of the cellulose fibres by use of any or any combination of cutting, shredding, disbursement, division and/or milling procedures.

10. A method according to claim 9 wherein the pre-processing step includes the use of liquid and/or gas jet apparatus to apply said liquid and/or air under pressure to the cellulose fibres of the selected source material.

11. A method according to claim 1 wherein the treatment step combs the cellulose fibres of the selected source materials into said individual fibres.

12. A method according to claim 1 wherein the liquid added to the material mixture sets the material mixture to have a solid content of between 10-90% prior to the same entering the processing stage.

13. A method according to claim 1 wherein said elements are selectively positioned so as to form a first zone to cause fibre defibrillation, a second zone to cause fibre-to-fibre defibrillation, a third zone to cause a higher and a lower pressure state changing of the structure of the fibres and a fourth zone to perform a holding action on the material mixture.

14. A method according to claim 1 wherein during the processing stage further components are added to the material mixture via feeder apparatus situated at predetermined intervals along a length of the screw extruder apparatus.

15. A method according to claim 14 wherein the further components are any or any combination of processed or unprocessed fibres, minerals, dyes, pigments, retention aids such as alum and polyacrylamides, sizing agents such as rosin and ketene dimers, and/or strengthening agents such as starches and/or lubricants.

16. A method according to claim 1 wherein during the processing step and/or prior to the forming step, one or more components are extracted from the material mixture.

17. A method according to claim 1 wherein the processed material mixture is further adapted by performing any or any combination of fibre singulation, separation and/or moisture conditioning.

18. A method according to claim 1 wherein the processed material mixture is passed to the forming step via a stream of gas.

19. A method according to claim 18 wherein said stream of gas is a stream of air which also performs a drying function on the material mixture.

* * * * *